US006567855B1

(12) United States Patent
Tubbs et al.

(10) Patent No.: US 6,567,855 B1
(45) Date of Patent: May 20, 2003

(54) PORTABLE PROCESSING SYSTEM WITH ALWAYS ON, ALWAYS CONNECTED CAPABILITY

(75) Inventors: Graham S. Tubbs, Phoenix; David Dannenberg, Tempe, both of AZ (US); Michael M. Tso, Hillsboro, OR (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 09/002,469

(22) Filed: Jan. 2, 1998

(51) Int. Cl.[7] .............................................. G06F 15/16
(52) U.S. Cl. ...................................... 709/232; 370/235
(58) Field of Search .................................. 370/236, 465, 370/316, 349, 329, 311, 235; 395/650, 309, 172; 375/376, 202, 240; 235/486, 380; 342/357; 709/249, 217, 208, 206, 232; 455/431, 553, 422, 574, 34; 359/172; 707/104; 307/10.1, 66; 345/156; 705/8

(56) References Cited

U.S. PATENT DOCUMENTS 4,814,591 A * 3/1989 Nara et al. .................. 235/380
5,150,361 A * 9/1992 Wieczorek et al. ......... 370/311
5,321,542 A * 6/1994 Freitas et al. ............... 359/172

(List continued on next page.)

OTHER PUBLICATIONS

Abidi. Low–Power Radio–Frequency IC's for Portable Communications. IEEE, Apr. 1995.*
Andren,C. IEEE 8802.11 Wireless LAN : Can we use it ofr multimedia ? . IEEE 1998.*
Press release, "Research In Motion and U.S. Robotics– Megahertz announce OEM relationship with wireless PC card," Research In Motion Ltd., Oct. 30, 1995, 3 pages.
"Socket Introduces PageCard™ Wireless Messaging System for Windows," Socket Communications, Inc., Jan. 30, 1995, 2 pages.
"Socket PageCard WMS," downloaded from http:www-.socketcom.com/pcds.htm on Nov. 4, 1997, 4 pages.
"Wireless Wide–Area Data Communications," downloaded from http://www.3com.com/client/mcd/technology/wpwire5.html on Nov. 4, 1997, 3 pages.
"The Emerging World–Wide Cellular Telephone Standard," Sinister Networks, 1994–1996, 2 pages.
"GSM Traffic & Signaling Channels," GSM Mobile Communications, 1997, 1 page.

(List continued on next page.)

*Primary Examiner*—Mark H. Rinehart
*Assistant Examiner*—Thong Vu
(74) *Attorney, Agent, or Firm*—Blakely, Sokoloff, Taylor & Zafman LLP (57) ABSTRACT

A technique for providing a portable processing system with "always on, always connected" capability is provided. The portable processing system is equipped with two data communication devices, either or both of which may be implemented on a PC Card. The first communication device is for receiving data over a wireless link over a narrowband link. The second communication device is for both receiving and transmitting data over a communication link over a wider band link, i.e., at a data rate that is substantially higher than that of the first communication device. The first communication device is always on, such that the narrowband link is always established. The second communication device may be activated only when data is to be transferred to or from the portable processing system, such that the wider band link is established only when it is needed. In one mode of operation the first communication device is used primarily to receive messages indicating that data is available for downloading to the portable processing system. When such data is available, the second communication device is used to download the data.

38 Claims, 4 Drawing Sheets

U.S. PATENT DOCUMENTS

| | | | | |
|---|---|---|---|---|
| 5,530,858 A | * | 6/1996 | Stanley et al. | 395/650 |
| 5,569,965 A | * | 10/1996 | Tsunehiro | 307/10.1 |
| 5,661,765 A | * | 8/1997 | Ishizu | 375/376 |
| 5,724,345 A | * | 3/1998 | Guarneri et al. | 370/316 |
| 5,726,984 A | * | 3/1998 | Kubler | 370/349 |
| 5,754,552 A | * | 5/1998 | Allmond et al. | 370/465 |
| 5,802,469 A | * | 9/1998 | Nounin et al. | 455/422 |
| 5,806,006 A | * | 9/1998 | Dinkins | 455/574 |
| 5,809,262 A | * | 9/1998 | Potter | 395/309 |
| 5,818,029 A | * | 10/1998 | Thomson | 235/486 |
| 5,828,655 A | * | 10/1998 | Moura et al. | 370/236 |
| 5,832,380 A | * | 11/1998 | Ray et al. | 455/431 |
| 5,844,893 A | * | 12/1998 | Gollnick et al. | 370/329 |
| 5,847,679 A | * | 12/1998 | Yee et al. | 342/357 |
| 5,951,639 A | * | 9/1999 | MacInnis | 709/217 |
| 5,991,639 A | * | 11/1999 | Rautiola et al. | 455/553 |
| 6,005,884 A | * | 12/1999 | Cook et al. | 375/202 |
| 6,028,984 A | * | 2/2000 | Kimball | 709/249 |
| 6,067,561 A | * | 5/2000 | Dillon | 709/206 |
| 6,073,136 A | * | 6/2000 | Bertram et al. | 707/104 |
| 6,205,173 B1 | * | 3/2001 | Obradors et al. | 375/240 |
| 6,327,248 B1 | * | 12/2001 | Hosokawa et al. | 370/235 |

OTHER PUBLICATIONS

"GSM Cell Broadcast," GSM Mobile Communications, 1997, 1 page.

"GSM Channel Coding," GSM Mobile Communications, 1997, 1 page.

"GSM Radio Frequency Usage," GSM Mobile Communications, date unknown, 1 page.

"Cellular–specific Terms," GSM Mobile Communications, 1997, 2 pages.

"Short Message Service," downloaded from http://www.dra.nl/borjeg/smsdesce.htm, updated Sep. 1997, 2 pages.

* cited by examiner

PORTABLE PROCESSING SYSTEM WITH ALWAYS ON, ALWAYS CONNECTED CAPABILITY

FIELD OF THE INVENTION

The present invention pertains to the field of portable processing systems. More particularly, the present invention relates to techniques for improving the communications capabilities of portable processing systems.

BACKGROUND OF THE INVENTION

Portable processing systems of. various different types are commonly available to consumers today. Examples of such systems are notebook computers, personal information managers (PIMs), and personal digital assistants (PDAs), and new varieties of portable processing systems are continuously emerging. Such systems are popular because they provide their users with great convenience and flexibility in comparison to conventional desktop systems. There are many situations in which a user of a portable processing system may have a need to access data that is stored in some remote processing system. For example, the user may wish to access an electronic mail (e-mail) account maintained by an on-line service provider, to view a site on the World Wide Web, or to download a file from another computer. Unfortunately, conventional portable processing systems such as those mentioned above generally lack the ability to maintain a constant network connection when they are operated in a truly "mobile" manner, i.e., when the user does not have access to a physical ("wireline") network connection or a power outlet.

One reason for this shortcoming is that wireless modems, which are used in many portable processing systems to make network connections in the absence of a wireline connection, typically rely upon the power supply of the portable processing system. When the system is operating on battery power, such as when traveling in a vehicle, the modem's dependence upon the system's battery limits the on-line time that is available to the user. In order to avoid having to constantly recharge the battery, a mobile user might power up the computer and log on to the Internet only briefly once or twice a day, to read and send electronic mail or to perform other on-line functions. Or, notwithstanding the power consumption problem, it may simply be inconvenient for a user to power up the computer more than once or twice a day. Thus, mobile users today generally function in a "pull" mode; that is, they access the network and download data when they can. The rest of the time, they are essentially cut off from receiving potentially vital, time-critical information. Such data may be obsolete by the time the user is able to establish a network connection and download it.

For many people, such as business travelers who require constant access to their electronic mail and other network services, this manner of use can be inconvenient if not unacceptable. Therefore, what is needed is a technique for enabling a portable processing system to have a constant data link to other systems, so that the user can always receive time-critical data in a timely manner.

SUMMARY OF THE INVENTION

The present invention includes a portable processing system which includes two communications units for providing data communication with a remote device at different data rates. A first communication unit provides data communication with a remote device at a first data rate. A second communication unit provides bi-directional data communication with a remote device at a second data rate that is substantially higher than the first data rate. The first communication unit is used to control activation of the second communication unit. Other features of the present invention will be apparent from the accompanying drawings and from the detailed description which follows.

BRIEF DESCRIPTION OF THE DRAWINGS

The present invention is illustrated by way of example and not limitation in the figures of the accompanying drawings, in which like references indicate similar elements and in which.

DETAILED DESCRIPTION

A portable computer having "always on, always connected" (AOAC) capability is described. In the following description, for purposes of explanation, numerous specific details are set forth in order to provide a thorough understanding of the present invention. It will be evident, however, to one skilled in the art that the present invention may be practiced without these specific details. In other instances, well-known structures and devices are shown in block diagram or other symbolic form in order to facilitate description of the present invention.

The present invention includes a technique according to which a portable processing system, such as a notebook computer, PIM, PDA, or other device, can be feasibly provided with AOAC capability, i.e., the capability to receive data from remote locations at all times, even when operated in a highly mobile manner. Accordingly, the present invention allows data to be "pushed" out to a mobile user, whereas today mobile users generally function in a "pull" mode, downloading data whenever they can. Specifically, the present invention allows the user to be notified immediately of data to be downloaded, such as a new e-mail message. The user can then retrieve and evaluate that data at his leisure. The present invention, therefore, improves the utility of many portable processing devices.

Figure 1:
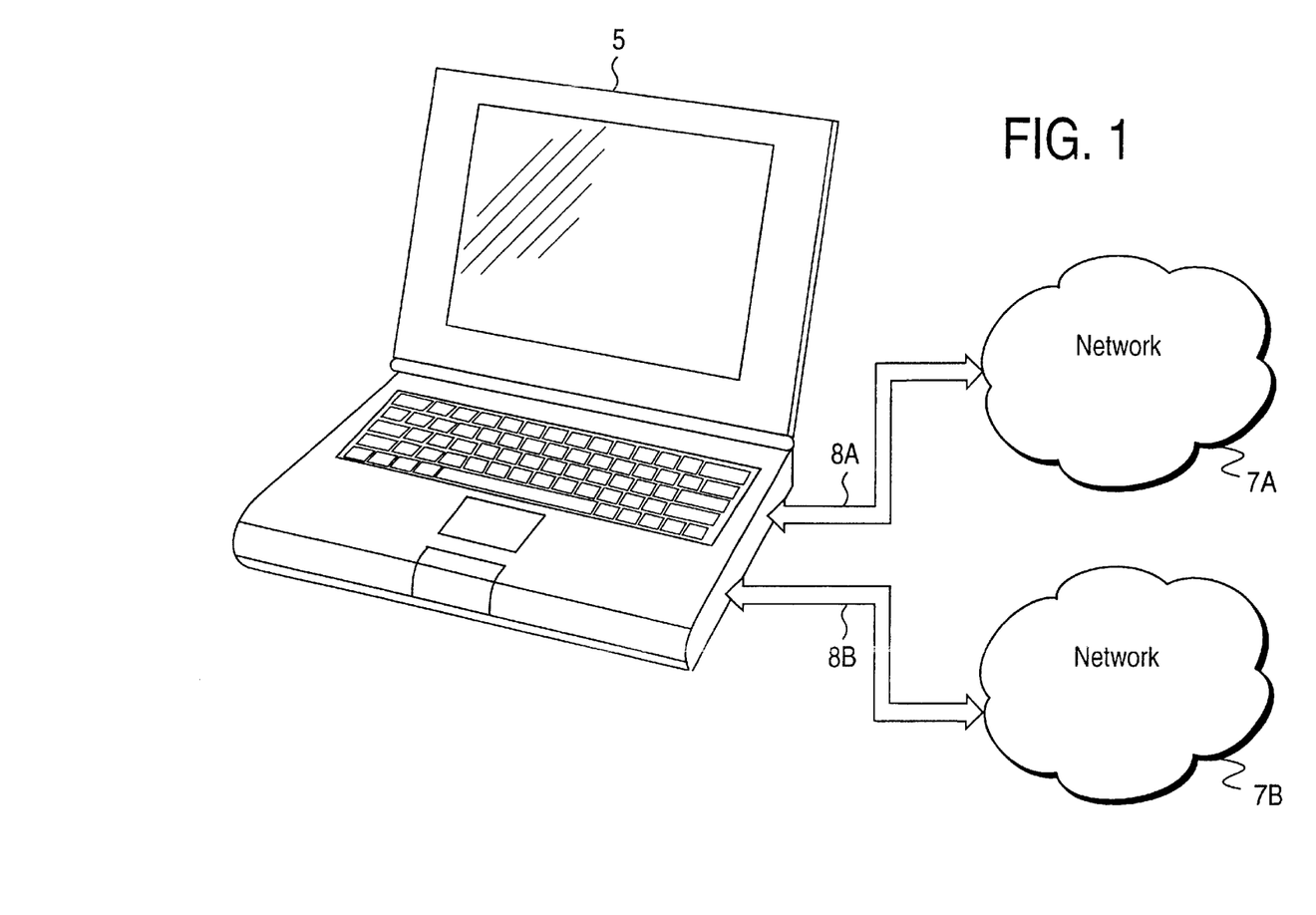
FIG. 1 illustrates a notebook computer having two network connections using different data rates.

Referring to FIG. 1, the present invention is used to provide a notebook computer 5 with AOAC capability. In other embodiments, a PIM, PDA, or other type of portable processing system can be substituted for the notebook computer 5. In accordance with the present invention, the notebook computer 5 is provided with two communication links 8A and 8B. Communication link 8A provides a narrowband (low bit rate) connection to a network 7A, and communication link 8B provides a wider bandwidth (higher data rate) connection, relative to link 8A, to a network 7B. Accordingly, link 8A is referred to in this description as the "thin pipe", while link 8B is referred to herein as the "thick pipe." The computer 5 is equipped with two separate communication devices to establish links 8A and 8B, as will be described below. Communication link 8A is a wireless radio frequency (RF) connection to a "narrowband" network. The narrowband network may be, for example, a paging network or a network conforming to the Global System for Mobile communications/Short Message Service (GSM/SMS) standard. Link 8B may be a wireless RF link, such as wireless Local Area Network (LAN) link, cellular link, etc., or it may be a wireline link, such as an Integrated Services Digital Network (ISDN) line, a Digital Subscriber Line (xDSL), a cable television connection, a conventional telephone line, an Ethernet or other LAN connection, or the like. Note that networks 7A and 7B are shown as separate networks for purposes of illustration; however, there may be overlap between the two networks.

The dual communication link approach of the present invention can be implemented based upon well-known communication standards. As indicated above, one suitable standard is GSM, which is a standard for digital cellular telephony that is currently used in numerous countries worldwide. GSM/SMS specifies two-way wireless voice communication, and two-way paging capability using brief alphanumeric messages.

In accordance with the present invention, the thin pipe 8A is always established ("on") and is generally used to notify the user of the computer 5 when data is available for downloading, such as when an e-mail message has been received by the user's account. The thin pipe 8A may be supported by its own, dedicated power source, so that it can remain on without draining the battery of the computer 5. This technique allows the computer 5 to be feasibly provided with AOAC capability.

The thick pipe 8B is established ("on") only when needed, such as when the user wishes to retrieve a new e-mail message. Thus, when data is available for downloading to the computer 5, the thick pipe 8B is used to actually download the data, at a data rate that is significantly higher than what the narrowband link 8A would permit. For example, assuming the network 7A is a paging network, the thin pipe might support. a data rate of 4.8 kilobits per second; in contrast, the thick pipe 8B might be a conventional wireless modem link that supports a data rate of approximately 56 kilobits per second. The thick pipe 8B is established using power from the power supply of the notebook computer 5.

The techniques of the present invention can be applied as follows. In one approach, the computer 5 and the thick pipe 8B are normally off, and the thin pipe 8A is normally on. Messages received over the thin pipe 8A are stored, and the reception of such messages are signaled to the user by a Light Emitting Diode (LED), Liquid Crystal Display (LCD) or other similar indicator. Alternatively, the thin pipe 8A may be normally off and periodically "wake up" to determine if any data is waiting.

When a message is received over the thin pipe 8A, the computer 5 is turned on to display the received message. If the data is simply a notification that other data (e.g., an e-mail message) is available for downloading, then the user can select a second mode in which both the computer 5 and the thick pipe 8B are on, and the thin pipe 8A is either on or off. In the second mode, data can be downloaded to the computer 5 over the thick pipe 8B.

The content of the data received from the thin pipe 8A can be examined automatically (such as by executing appropriate software, for example) to cause the computer 5 and the thick pipe 8B to be powered up selectively in response to detecting predetermined content, such as an e-mail message from a particular sender. Data can also be automatically downloaded over the thick pipe 8B in response to detecting such predetermined content. These functions may alternatively be provided by hardware or a combination of hardware and software.

Figure 2:
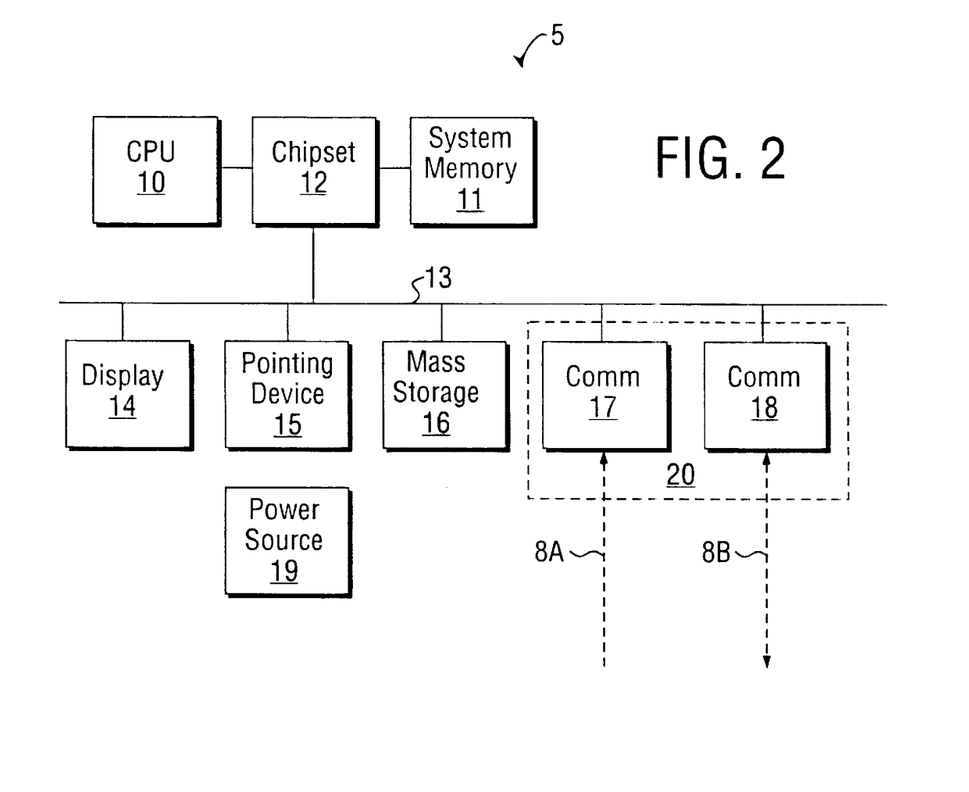
FIG. 2 is a block diagram of a computer system with dual communication devices for providing two network connections using different data rates.

Referring now to FIG. 2, a block diagram of the portable computer 5 is shown according to one embodiment. The computer 5 includes a Central Processing Unit (CPU) 10 and system memory 11. The system memory may include both Random Access Memory (RAM) and read-only memory (ROM). The CPU 10 is coupled to the system memory 11 by a chipset 12, which provides both a system bus and a connection to a peripheral bus 13. The peripheral bus 13 may be a Peripheral Component Interconnect (PCI) bus, for example. The chipset 12 also includes one or more controllers for controlling communication between the CPU 10 and system memory 11, between the CPU 10 and peripheral devices on bus 13, and between peripherals and system memory 11. The portable computer 5 is powered by an internal power source 19, which may be a battery.

The peripheral devices on bus 13 include a display 14, a pointing device 15, a mass storage device 16, and two communication devices 17 and 18. The communication devices 17 and 18 are used to implement the thin pipe 8A and the thick pipe 8B, respectively. The display device 14 may be any conventional display device, such as an LCD display. The pointing device 15 may be a trackball, a touchpad, or any other similar device. The mass storage device 16 includes any device suitable for storing large volumes of data, such as a magnetic disk or tape, a Magneto-Optical (MO) storage medium, a form of compact disk (e.g., CD-ROM, CD-R, CD-RW, etc.) or Digital Versatile Disk (DVD).

Communication devices 17 and 18 are used to establish the thin pipe 8A and the thick pipe 8B, respectively. Communication device 17 may be a simple receiver such as found in conventional pagers. In other embodiments, however, communication device 17 may also have the ability to transmit data, such that the thin pipe 8A is a bidirectional link. Communication device 18 is used to implement the thick pipe 8B and is preferably operable as both a receiver and a transmitter. As indicated above, communication device 18 may include a LAN adapter, an ISDN adapter, an xDSL adapter, a conventional telephone modem, a wireless modem, or any other suitable device.

It will be understood that, if link 8A or 8B is a wireless link, the computer 5 may include one or more antennas and associated RF input/output circuitry (not shown) coupled to device 17 and/or 18, as appropriate. In addition, note that while FIG. 2 shows two separate communication devices, 17 and 18, for establishing link 8A and link 8B, respectively, common components can be employed in computer 5 to implement links 8A and 8B. For example, communication devices 17 and 18 may share a common antenna and RF circuitry. Further, communication devices 17 and 18 may represent a single communication device that performs the functions of both devices. This combination would be the case for GSM/SMS.

Communication devices 17 and 18 may be implemented on a single circuit card 20, which can be an add-in card installed in the processing system after the manufacturing process. In one embodiment, illustrated in FIG. 3, the communication devices 17 and 18 are both mounted on the substrate of the motherboard 35 of the computer 5, along with the CPU 10 and the chipset 12, and are coupled to the chipset 12. Alternatively, communication devices 17 and 18 can be implemented on separate circuit cards.

Figure 3:
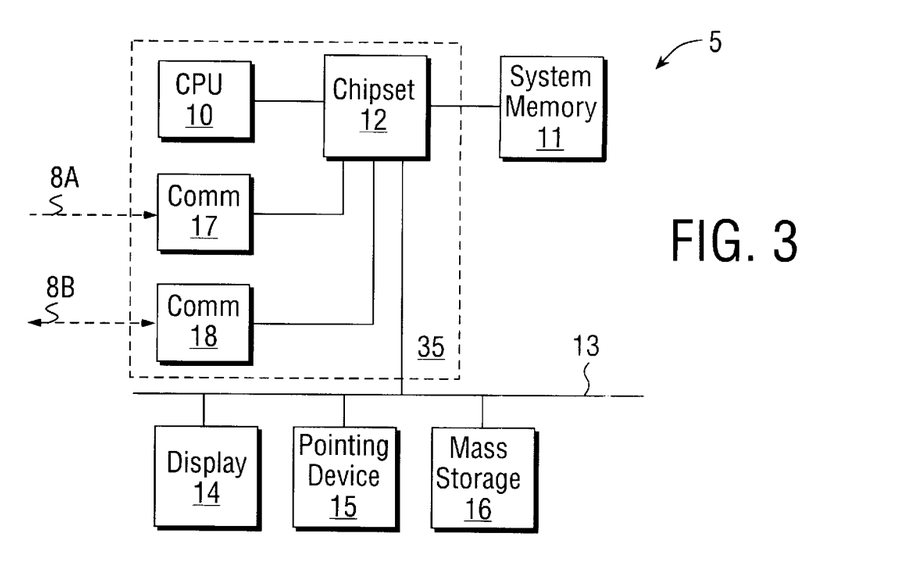
FIG. 3 is a block diagram of a computer system in which dual communication devices are implemented on the motherboard of the computer system.
Figure 4:
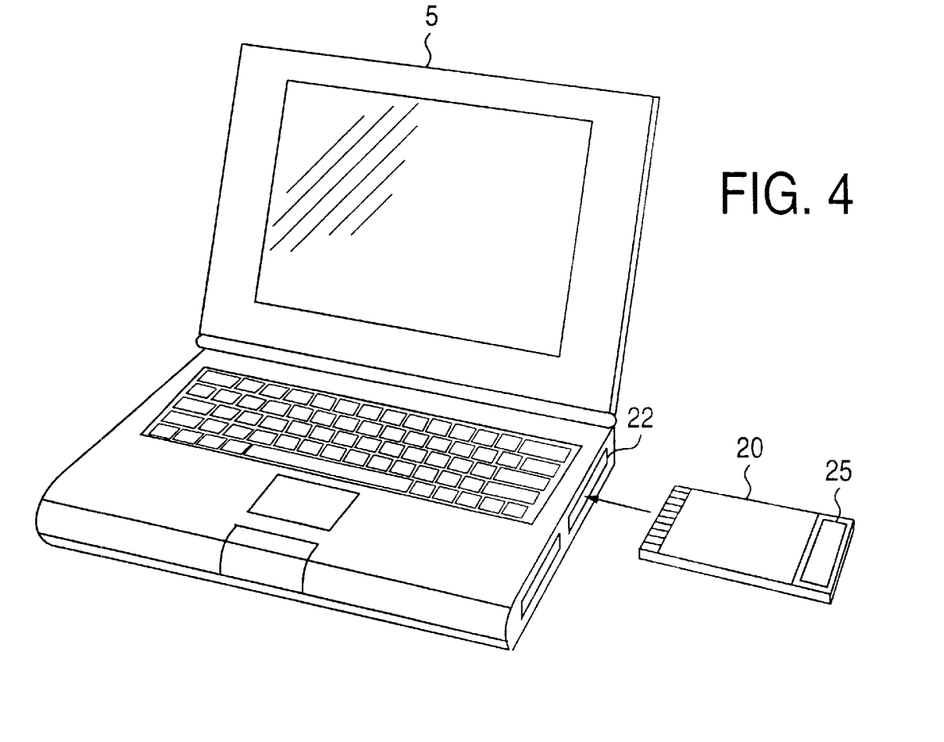
FIG. 4 illustrates a PC Card on which dual communication devices according to the present invention can be implemented.

In yet another embodiment, shown in FIG. 4, the circuit card 20 may be a Personal Computer Memory Card International Association (PCMCIA) card, also known as a PC Card, which can be inserted into a corresponding PC Card slot 22 in the housing of the computer 5. The PC Card 20 may include its own display device 25, which may be a simple LED, or, as represented in FIG. 3, a more sophisticated display device that can display short messages based on data received over the thin pipe 8A, such as an LCD as found in many conventional pagers. With such an embodiment, the user can carry the PC Card 20 in his pocket or on his belt as he would a conventional pager, while the thin pipe 8A remains always on and connected. When a notification is received via the thin pipe 8A that data is available to be downloaded, the user can insert the PC Card 20 into the computer 5 to enable the thick pipe 8B to be activated to download data.

In any embodiment in which the user can separately carry a communication device 17 for the thin pipe 8A (i.e., a "pocketable" embodiment), it may also be desirable to provide an alternative, non-visual way of notifying the user of the reception of data over the thin pipe 8A, such as an audible notification or vibration.

Figure 5:
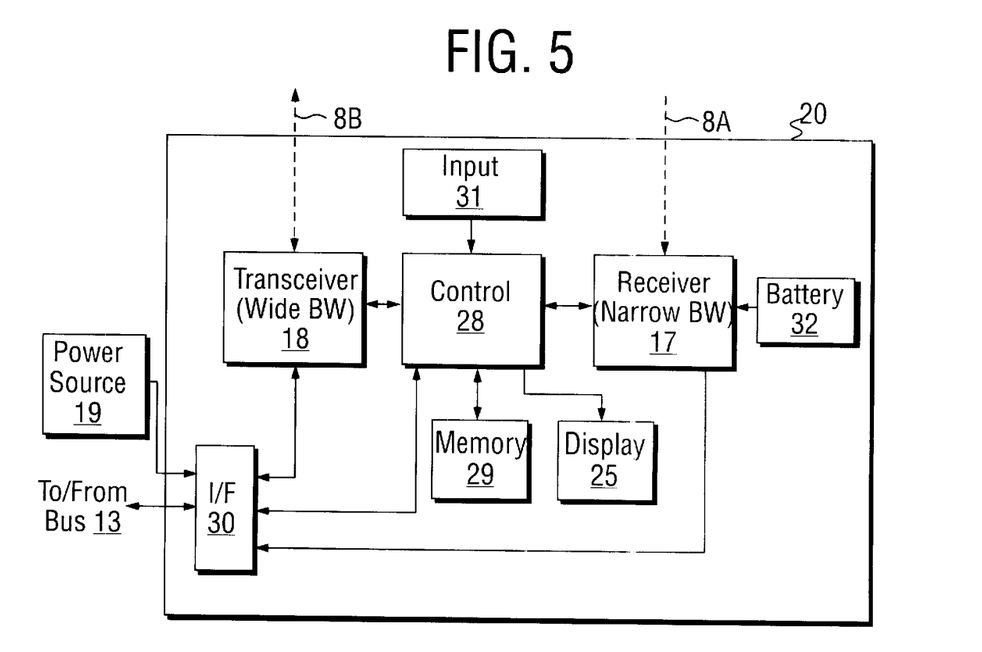
FIG. 5 is a block diagram of components of the PC Card of FIG. 4.

FIG. 5 is a block diagram of the circuitry of the PC Card 20, according to one embodiment. Note that FIG. 5 is intended to convey an understanding of the functionality of the components of PC Card 20 and not to depict its exact circuit architecture; many different circuit architectures are possible within the scope of the present invention. The PC Card 20 includes communication device 17, which is a narrowband receiver in the illustrated embodiment, but which can alternatively be a transceiver (i.e., have the ability to both transmit and receive). The PC Card also includes communication device 18, which is a wider bandwidth transceiver. The PC Card 20 also includes control circuitry 28, a memory 29, the display 25, a bus interface 30, an input unit 31, and a battery 32.

The control unit 28 controls the overall operation of the circuitry on the PC Card 20 and may include a microprocessor, controller, or other similar circuitry, the details of which are not required for an understanding of the present invention. The control unit 28 is coupled to the transceiver 18, the receiver 17, the memory 29, the display 25, the interface 30 and the input unit 31. The memory 29 can be used to store software instructions for execution by the control unit 28, data received via the thin pipe 8A, and other types of data. The input unit 31 can be used to receive relatively simple inputs for scrolling messages in the display 25, recalling stored messages from memory 29, and otherwise controlling the components on PC Card 20. The input unit may include push buttons, switches, or other simple controls. The interface 30 couples the PC Card 20 to the peripheral bus 13 of the computer 5 when the PC Card 20 is inserted into slot 22. The transceiver 18 and the receiver 17 are also coupled to the interface 30.

Note that while FIG. 5 shows two separate communication devices, 17 and 18, for establishing link 8A and link 8B, respectively, links 8A and 8B may be implemented on PC Card 20 using common components. For example, as noted above, communication devices 17 and 18 may share a common antenna and RF input/output circuitry (not shown), or communication devices 17 and 18 may represent a single communication device that performs the functions of both.

In the illustrated embodiment, the receiver 17 receives power from its dedicated battery 32 on the PC Card 20, whereas the transceiver 18 is powered from the power source 19 of the computer 5 via the interface 30. This embodiment enables the thin pipe 8A to remain active when the computer 5 is off, even when the PC Card is not inserted in slot 22 of the computer 5. Thus, the user can carry the PC Card 20 in his pocket or on his belt, and insert the PC Card 20 into the computer 5 to enable the thick pipe 8B when a notification is received via the thin pipe 8A that data is available to be downloaded.

A notification received over the thin pipe 8A may be signaled to the user via the display device 25 on the PC Card 20, the display device 14 of the computer 5, a separate LED or other similar indicator on the computer 5, or any combination of these methods. A notification may be the simple lighting of an LED, or it may be in the form of a text message, such as the header of a newly received e-mail message. If the PC Card 20 is already inserted in the slot 22 when a notification is received over the thin pipe 8A, the notification message may be signaled to the user either via the primary display 14 of the computer 5 or the display 25 of the PC Card 20, depending upon the content of the message. If the PC Card 20 is not inserted when the notification is received, then the user can determine the nature of the complete message from the notification and decide whether to immediately insert the PC Card 20 into the computer 5 to retrieve the complete message via the thick pipe 8B, or to wait until a later time.

As noted above, the present invention may be used to automatically perform certain functions in response to receiving a particular type of notification over the thin pipe 8A. These functions might include powering up the portable processing system and the thick pipe 8B and downloading data over either the thick pipe 8B or the thin pipe 8A. Such functionality may be provided using appropriate software.

An example of how such capability might be applied is as follows. Suppose a message is received over the thin pipe 8A by a portable processing system of the present invention. Suppose further that the message indicates document "X" is ready for review and that this message is a previously specified notification. In response to receiving the message, the portable processing system identifies the notification as a predetermined notification and automatically transmits a request for document "X" to the sender of the message. In addition, the main power supply of the processing system is automatically turned on, powering up the processing system and the thick pipe 8B. Document "X" is then automatically downloaded to the portable processing system over the thick pipe 8B. When the download is complete, the main power supply is automatically turned off, turning off the thick pipe 8B and the portable processing system. Alternatively, instead of powering up the processing system and the thick pipe 8B in response to receiving the message, document "X" might be downloaded automatically over the thin pipe 8A, which remains always on and always connected. These functions can be performed without any input from the user and in a manner that is transparent to the user. The completed download can be signified to the user by the lighting of an LED or a short text message on an LCD display.

The present invention, therefore, improves the utility of a portable processing device, such as a notebook computer, PIM, PDA, or other similar device. One potentially advantageous application of the present invention is for PIM synchronization. For example, a request may be made to update the user's appointment calendar, which is transmitted to the computer 5 via the thin pipe 8A. The user can then respond to this notification by indicating whether he wishes to accept the proposed appointment. The response can be made via the thin pipe 8A or the thick pipe 8B, and all copies of the user's calendar can be updated in synchronization.

Thus, a portable processing system having "always on, always connected" capability has been described. Although the present invention has been described with reference to specific exemplary embodiments, it will be evident that various modifications and changes may be made to these embodiments without departing from the broader spirit and scope of the invention as set forth in the claims. Accordingly, the specification and drawings are to be regarded in an illustrative rather than a restrictive sense.

What is claimed is:

1. A portable processing device comprising:
   a processor;
   a memory coupled to the processor;
   a first communication unit coupled to the processor for receiving data over a first link having a first bandwidth, wherein the first link is a wireless link;
   a second communication unit coupled to the processor for transmitting and receiving data over a second link having a second bandwidth substantially greater than the first bandwidth, wherein operation of the second communication device is automatically controllable based on data received by the first communication device over the first link
   a first power source to power the portable processing device excluding the first communication unit; and
   a second power source to power only the first communication unit.

2. A portable processing device according to claim 1, wherein the second bandwidth is at least three times the first bandwidth.

3. A portable processing device according to claim 1, wherein the second bandwidth is approximately ten times the first bandwidth.

4. A portable processing device according to claim 1, wherein the second link is a wireless link.

5. A portable processing device according to claim 1, wherein the first link comprises a link to a paging network.

6. A portable processing device according to claim 1, further comprising means for automatically examining a content of the data received by the first communication unit.

7. A portable processing device according to claim 6, further comprising means for selectively activating the portable computer depending on the content of data received by the first communication unit.

8. A portable processing device according to claim 6, further comprising means for automatically outputting a message to a user based on the content of the data received by the first communication unit.

9. A portable processing device according to claim 6, further comprising means for automatically causing data to be downloaded to the portable computer using the second communication unit depending on the content of the data received by the first communication unit.

10. A portable processing device according to claim 1, further comprising means for automatically using the first communication unit to determine whether data is available for downloading to the portable computer, the data for downloading to the portable computer using the second communication unit.

11. A portable computer according to claim 1, wherein the first communication unit is operable at least while the portable computer is powered off, and wherein the second communication unit is operable only while the portable computer is powered on.

12. A circuit card for insertion into a portable processing system, the circuit card comprising:
   an interface for coupling the circuit card to the processing system;
   a first communication unit coupled to the interface for receiving data over a first link at a first data rate, wherein the first link is a wireless link; and
   a second communication unit coupled to the interface for transmitting and receiving data over a second link at a second data rate substantially greater than the first data rate, wherein activation of the second communication unit is controllable using the first communication unit, wherein the circuit card is configured for insertion through a corresponding permanent opening in a housing of the portable processing system to connect the interface to the processing system.

13. A circuit card according to claim 12, wherein the circuit card comprises a PCMCIA card.

14. A circuit card according to claim 12, wherein the second bandwidth is at least four times the first bandwidth.

15. A circuit card according to claim 12, wherein the second bandwidth is at least approximately ten times the first bandwidth.

16. A circuit card according to claim 12, wherein the first link comprises a link to a paging network.

17. A circuit card according to claim 12, further comprising means for automatically examining a content of the data received by the first communication unit.

18. A circuit card according to claim 17, further comprising means for selectively activating the second communication unit depending on the content of data received by the first communication unit.

19. A circuit card according to claim 17, further comprising means for outputting a message to a user based on the content of the data received by the first communication unit.

20. A circuit card according to claim 17, further comprising means for automatically causing data to be downloaded to the processing system using the second communication unit depending on the content of the data received by the first communication unit.

21. A circuit card according to claim 12, further comprising means for automatically using the first communication unit to determine whether data is available for downloading to the processing system, the data for downloading to the processing system using the second communication unit.

22. A circuit card according to claim 12, further comprising a power source to power the first communication unit.

23. A circuit card according to claim 12, further comprising an indicator to provide an indication to a user in response to receiving said data over the first link at the first data rate.

24. A method of providing communication between a portable processing system and a remote site, the method comprising:
   using a first communication device of the portable processing system to receive data at the portable processing system at a first data rate;
   in response to receiving the data at the portable processing system at the first data rate, activating a second communication device of the portable processing system; and
   using the second communication device to communicate data with the remote site at a second data rate substantially greater than the first data rate.

25. A method according to claim 24, wherein the processing system is a notebook computer.

26. A method according to claim 24, wherein using a first communication device of the portable processing system to receive data at the portable processing system at a first data rate comprises receiving the data at the portable processing system at the first data rate from a remote site over a wireless data link.

27. A method according to claim 26, wherein receiving the data at the portable processing system further comprises receiving the data at the portable processing system from a paging network.

28. A method according to claim 24, wherein the second data rate is at least three times the first data rate.

29. A method according to claim 24, wherein the second data rate is at least approximately ten times the first data rate.

30. A method according to claim 24, further comprising automatically examining a content of the data received at the first data rate.

31. A method according to claim 30, further comprising selectively activating the second communication device depending on the content of data received using the first communication device at the first data rate.

32. A method according to claim 30, further comprising outputting a message to a user based on the content of the data received using the first communication device at the first data rate.

33. A method according to claim 30, further comprising automatically using the second communication device to download data from the remote site at the second data rate depending on the content of the data received at the first data rate.

34. A communication device for providing data communication capability to a portable processing system, the communication device comprising:

a receiver to receive data from a remote site over a wireless link at a first data rate;

a control unit to control operation of the communication device;

a power source to power the communication device; and an interface to allow the communication device to be removably connected to the portable processing system;

wherein the communication device is capable of receiving said data at the first data rate while the communication device is disconnected from the portable processing system, and wherein the communication device is configured to determine, in response to receiving said data, that additional data is available for downloading to the portable processing system at a second data rate substantially higher than the first data rate.

35. A communication device according to claim 34, further comprising a transceiver, such that said additional data can be downloaded to the portable processing system at the second data rate using the transceiver by connecting the communication device to the portable processing system.

36. A communication device according to claim 35, wherein the transceiver is powered by a power supply of the portable processing system via said interface.

37. A communication device according to claim 34, wherein the communication device is configured to activate a transceiver to download said additional data to the processing system at the second data rate when the communication device is connected to the portable processing system, after determining that the additional data is available for downloading.

38. A communication device according to claim 34, further comprising an indicator to provide an indication to a user in response to determining that the additional data is available for downloading to the portable processing system.

* * * * *

UNITED STATES PATENT AND TRADEMARK OFFICE
CERTIFICATE OF CORRECTION

PATENT NO. : 6,567,855 B1
DATED : May 20, 2003
INVENTOR(S) : Graham S. Tubbs, David Dannenberg and Michael M. Tso

It is certified that error appears in the above-identified patent and that said Letters Patent is hereby corrected as shown below:

Column 8,
Lines 59-65, delete:
"in response to receving the data at the portable processing system at the first data rate, activating a second communication device of the portable processing system; and
using the second communication device to communicate data with the remote site at a second rate substantially greater than the first data rate."

and insert:
-- using the data received by the first communication device to determine whether additional data is available for downloading to the portable processing system, the additional data to be downloaded to the portable processing system using a second communication device of the portable processing system at a second data rate substantially greater than the first data rate;
in response to determining that additional data is available for downloading to the portable processing system, activating the second communication device; and
using the second communication device to download the additional data to the portable processing system at the second data rate. --

Signed and Sealed this

Twentieth Day of July, 2004

JON W. DUDAS
*Acting Director of the United States Patent and Trademark Office*